United States Patent [19]

Hendrix et al.

[11] Patent Number: 4,957,804

[45] Date of Patent: Sep. 18, 1990

[54] FIBROUS SUPPORT CUSHION

[75] Inventors: Kenneth L. Hendrix, Trinity; Carl K. Rogers, High Point, both of N.C.

[73] Assignee: Hendrix Batting Company, High Point, N.C.

[21] Appl. No.: 257,991

[22] Filed: Oct. 14, 1988

[51] Int. Cl.$^5$ .......................... B32B 5/08; B32B 5/26; B68G 5/00
[52] U.S. Cl. ...................................... 428/212; 5/448; 428/287; 428/288; 428/296; 428/302; 428/317.7; 428/319.7; 428/361; 428/373; 428/395
[58] Field of Search ............... 428/287, 288, 296, 297, 428/373, 395, 302, 212, 317.7, 319.7, 361; 5/448

[56] References Cited

U.S. PATENT DOCUMENTS

| | | | |
|---|---|---|---|
| 4,129,675 | 12/1978 | Scott | 428/288 |
| 4,281,042 | 7/1981 | Pamm | 428/361 |
| 4,304,817 | 12/1981 | Frankosky | 428/361 |
| 4,668,562 | 5/1987 | Street | 428/218 |
| 4,818,599 | 4/1989 | Marcus | 428/288 |

*Primary Examiner*—James C. Cannon
*Attorney, Agent, or Firm*—Rhodes, Coats & Bennett

[57] ABSTRACT

Hollow polyester fibers are blended with sheath/core binder fibers and bonded together in a ratio of 80 to 18 to form a support cushion. Several layers may be laminated together, the denier of the polyester fibers in at least some of the layers varying from the denier of the polyester fibers in other layers. For this purpose, the deniers of the polyester in the various layers are selected from the range including 4 to 40.

7 Claims, 1 Drawing Sheet

FIBROUS SUPPORT CUSHION

BACKGROUND AND SUMMARY OF THE PRESENT INVENTION

This invention is directed to a support cushion suitable for seat cushions and mattresses and, more particularly, to a bonded fibrous batt of staple polyester fibers blended with sheath/core binder fibers.

Years ago, the stuffing for seat cushions was formed of natural fibers such as cotton or cellulosic based synthetic fibers such as rayon. In more recent years, the furniture industry in the construction of seat cushions and mattresses has moved toward foamed polymeric materials. There are several disadvantages to foamed polymeric materials including the facts that: (1) in case of fire, such foams often generate toxic gases; (2) some of the foams are or can develop characteristics that are irritating to certain allergies; and (3) it is difficult to develop consistent uniformity in the seat support characteristics of cushions made of various types of foam. For the purposes of this disclosure, the term "support cushion" includes both seat cushions and mattresses, i.e., those cushions which support a substantial portion of the human body, whether it be in the seated or reclined position.

There have been some attempts to construct support cushions from staple polymeric fiber. In one approach, staple polymeric (usually polyester) fiber is blown into a cover in the same manner as pillows and an upholstered covering placed therearound. This is not a satisfactory approach to support cushioning, because the support simply is not there. Another approach, as best illustrated in U.S. Pat. No. 4,668,562, involves the vacuum bonding of non-woven polymeric fibers under compression to densify the fibers to a desired extent. In this construction, fibers of a relatively high melting point and fibers of a relatively low melting point are mixed. When the batt is then heated and placed under compression, the lower melting point fibers melt and bond the other high-melt-point fibers together, holding them together in the compressed state, therein resulting in a denser layer of fibers than would be achieved in a non-compressed state. While this approach offers some advantages, there are certain difficulties attendant thereto. For example, it is difficult to get a soft surface with such approach; it is difficult to simulate a down or other feather construction; it is difficult to obtain a construction that conforms well to the shape of the human body; and difficult to obtain a uniform density in construction.

In the present invention, first of all, there is an attempt to form an improved fibrous polymeric support cushion by blending polyester fibers, preferably hollow polyester fibers, with sheath/core binder fibers in a non-compressed construction While the resulting cushioning may be formed as one thick batt, preferably it is formed as a plurality of polymeric layers laminated together. In such a construction, each layer may utilize fibers of different denier and characteristics. As contemplated in the present invention, the polyester fibers should have a denier in the range of 4 to 40.

While conventional polyester fibers may be utilized within the scope of the present invention, more recently there has been developed a hollow fiber configuration which provides significant advantages in cushion crown, bulk support, durability, and reduced weight when compared to conventional fibers of the same denier. Because of their greater bulk and filling power, hollow fibers therefore achieve a more attractive crown and plumpness without an increase in weight. Stated otherwise, hollow fibers provide superior performance at the same weight or the same performance at less weight.

Recently, there has recently been developed a sheath/core binder fiber (also sometimes referred as a dual-polymer binder fiber) in which a concentric core of one polymeric material (for example, polyester) surrounded by a special low-melt-point polymer sheath which, after exposure to heat, melts and bonds the core fiber with adjacent, more conventional, fibers. This provides cohesiveness and strength to the final product.

In a more specific embodiment of the present invention, the support cushion of the present invention includes a plurality of layers of staple polymeric batt laminated together, each of the layers including a combination of polyester fibers and sheath/core binder fibers bonded together. In each layer, the polyester fibers make up more than 50% of the batting. In order to custom design a cushion of described characteristics, the denier or other characteristics of the polyester fibers in some layers may vary from the denier and characteristics of the polyester fibers in other layers It is, therefore, an object of the present invention to provide an improved support cushion formed of bonded staple polyester fibers.

It is another object of the present invention to provide an improved support cushion of the type described which simulates a down or other type of feather cushion on or adjacent to the surface thereof; however, which cushion includes layers therebeneath which have improved support characteristics.

It is yet another object of the present invention to provide a laminated support cushion which is formed primarily of a plurality of layers of bonded polyester fibers; the polyester fibers for each layer being selected to achieve a resulting cushion which has desired characteristics of surface softness and underlying firm support.

Other objects and a fuller understanding of the invention will become apparent from the following detailed description of a preferred embodiment along with the accompanying drawings in which.

DETAILED DESCRIPTION OF A PREFERRED EMBODIMENT

Figure 2:
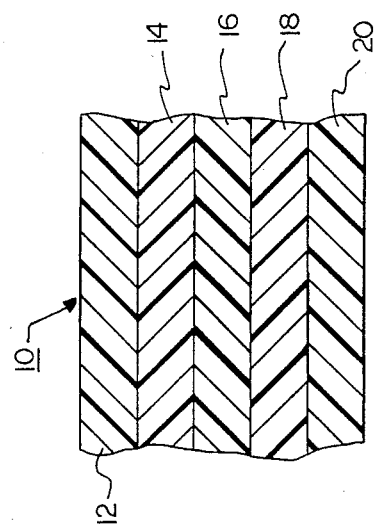
FIG. 2 is an enlarged perspective view of a sheath/core binder fiber as contemplated for use in the present invention.
Figure 3:
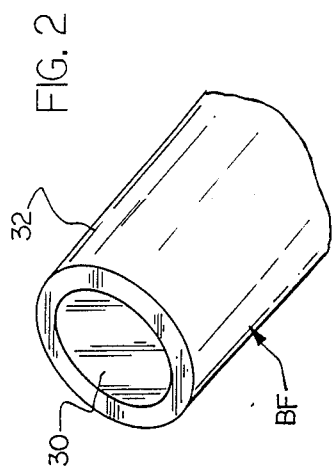
FIG. 3 is a sectional view of a typical cushion support constructed in accordance with the present invention.

Turning now to the drawings, in FIG. 3 there is a laminated cushion construction 10 which comprises a plurality of layers 12,14,16,18 and 20. Each layer is made up of a plurality of polyester fibers, preferably hollow polyester fibers, PF as illustrated in FIG. 1, and sheath/core binder fibers BF as illustrated in FIG. 2.

Figure 1:
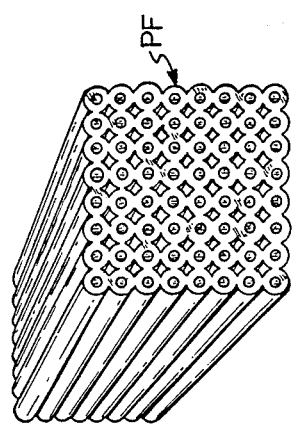
FIG. 1 is an enlarged perspective view of a hollow polyester fiber as contemplated for use in the present invention.

Looking at FIG. 1, a typical hollow polyester fiber PF is extruded through a specially designed spinerette to provide a resulting fiber that includes many openings extending longitudinally therethrough. These fibers are specially designed to provide a lighter weight material which has the same diameter or cross-sectional dimensions as the heavier solid polyesters. Because of the openings therethrough, one may achieve more loft for the same or less poundage. Hollow polyester fibers range in denier from 4 to 40 and are available in either a plain surface or a slickened surface. In order to provide a "slickened surface", the surface is coated with silicon. The slickened fibers have a low-friction surface resulting in a characteristic of greater softness.

Examples of hollow polyester fibers which are suitable for use in conjunction with the present invention include the various products from the DuPont Company of Wilmington, Delaware set forth in the table below:

| Fiber | Denier | Hollow/Solid | Slick |
| --- | --- | --- | --- |
| Dacron 76 | 25 | S | No |
|  | 40 | S | No |
| Dacron 251 | 15 | H | Yes |
| Dacron 255 | 5.5 | H | Yes |
| Hollofil II | 5.5 | H | Yes |
| Hollofil 76 | 15 | H | No |
| Hollofil 91 | 15 | H | Yes |
| Hollofil 95 | 15 | H | Yes |
| Hollofil 808 | 5.5 | H | No |

Turning now to FIG. 2, there is illustrated the sheath/core binding fiber BF, which fibers include a core 30 of a selected polymer such as polyester and a sheath 32 of a relatively low-melting polymer. Such binding fibers are generally available with sheath melting temperatures in the range of 110° C. to 200° C. While the sheath melts at a relatively low temperature, the core does not and, therefore, the melted polymer from the sheath bonds the core to neighboring fibers, so that the result is a bonded batting.

Turning now to FIG. 3, there is illustrated a cushion 10 of laminated construction. In the innermost layer 16, for example, 6 denier unslickened hollow polyester fibers are blended with the sheath/core binding fibers BF as illustrated in FIG. 2. A preferred ratio is 82% by weight of the polyester fibers and 18% by weight of the sheath/core binding fibers. However, other blends may also be utilized for various uses. In most situations, the percentage of hollow polyester fibers would be at least 75%; however, there are situations in which the hollow polyester fiber may provide merely a greater percentage (over 50%) of the total fibrous content in any layer. The polyester fibers PF are preferably hollow and selected from deniers in the range of 4 to 40. However, as illustrated in FIG. 3, a denier of six is utilized in the innermost or middle layer 16.

In the outer layers, a different construction is required. In order to achieve the simulation of a down surface construction, it is preferred that the fibers be hollow, slickened polyester fibers. In the illustrated embodiment, the outermost layers 12 and 20 utilize hollow, slickened polyester fibers having a denier of 15. Again, the 15-denier hollow, slickened polyester fibers of layers 12 and 20 are blended with sheath/core binding fibers in a ratio of approximately 82:18.

In the intervening layers 14 and 18, the support function is achieved. Therefore, it is preferred that a heavier fiber be utilized as, for example, 15-denier hollow, unslickened polyester fibers. Again, these fibers are blended with sheath/core binder fibers in substantially the same ratio.

In the construction of the cushion 10 of FIG. 5, each layer is formed by blending the specified hollow polyester fibers with the sheath/core binder fibers. Sometimes the preferred blend can be obtained from the fiber manufacturer, and sometimes the fabricator must blend the fibers themselves. Once the fibers are blended, they are laid down on a conveyor in a desired thickness as in a garnetting operation and the loose web of fibers is subjected to heat above the melting temperature of the sheath/core binder fibers and below the melting temperature of the other fibers in the web. The different webs are then stacked one atop the other as illustrated in FIG. 3 and glued together. The resulting laminated batt 10 of fibers is then squeezed together and forced into a cover in much the same way that a foam cushion is formed. The layers are uncompressed until such time as they are placed into the fabric cover. Therefore, when the bonding operation occurs, the fibers are essentially uncompressed, so that when they are put into the cover, they exhibit more resiliency, more uniformity, and more support. Further, because the outer surfaces are formed of slickened polyester fibers, there is a simulated down or feather construction which exhibits a better "feel" for the person sitting or reclining upon the cushion 10.

While the invention has been described in detail hereinabove, it is apparent that various changes and modifications might be made without departing from the scope of the invention. For example, there is allowance for considerable flexibility as far the selection of the denier of the polyester fibers and the ratio of polyester fibers to binder fibers is concerned. In addition, the hollow portion of the polyester fiber may include a plurality of passages rather than just a single passage in order to further improve the "feel" of the cushion. Therefore, the scope of the invention is to be determined by the accompanying claims in which:

What is claimed is:

1. A support cushion comprising a plurality of layers of staple, polymeric batt laminated together, each of said layers comprising a combination of polyester fibers and sheath/core binder fibers bonded together in a substantially uncompressed state, said polyester fibers making up more than 50% of said batt, wherein said plurality of layers include a central layer comprising a combination of polyester fibers of a prescribed denier and sheath/core binder fibers bonded together, an uppermost and lowermost layer comprising a combination of slickened polyester fibers of a prescribed denier and sheath/core binder fibers bonded together, and at least one intermediate layer between said central layer and each of said outermost layers comprising a combination of unslickened polyester fibers of a prescribed denier and sheath/core binder fibers bonded together.

2. A support cushion comprising a plurality of layers of staple, polymeric batt laminated together, each of said layers comprising a combination of polyester fibers and sheath/core binder fibers bonded together in a substantially uncompressed state, said polyester fibers making up more than 50% of said batt, the denier of said polyester fibers in some layers varying from the denier of the polyester fibers in other layers, wherein said plurality of layers include a central layer comprising a combination of hollow polyester fibers of a prescribed denier and sheath/core binder fibers bonded together, an uppermost and lowermost layer comprising a combination of hollow slickened polyester fibers of a prescribed denier and sheath/core binder fibers bonded together, and at least one intermediate layer between said central layer and each of said outermost layers comprising a combination of unslickened polyester fibers of a prescribed denier and sheath/core binder fibers bonded together.

3. The support cushion according to claim 2 wherein the polyester fibers in at least some of said layers are hollow.

4. The support cushion according to claim 2 wherein the polyester fibers in each layer make up more than 75% of said polymeric batt.

5. The support cushion according to claim 2 wherein the combination of fibers in each layer is substantially 82% polyester fibers and 18% sheath/core binder fibers.

6. The support cushion according to claim 2 wherein the denier of said polyester fibers is in the range of 4 to 40.

7. The support cushion according to claim 2 wherein said sheath/core binder fiber comprises a core of a relatively higher melt-point polymer and a sheath of a relatively lower melt-point polymer.

* * * * *